Figure 1:
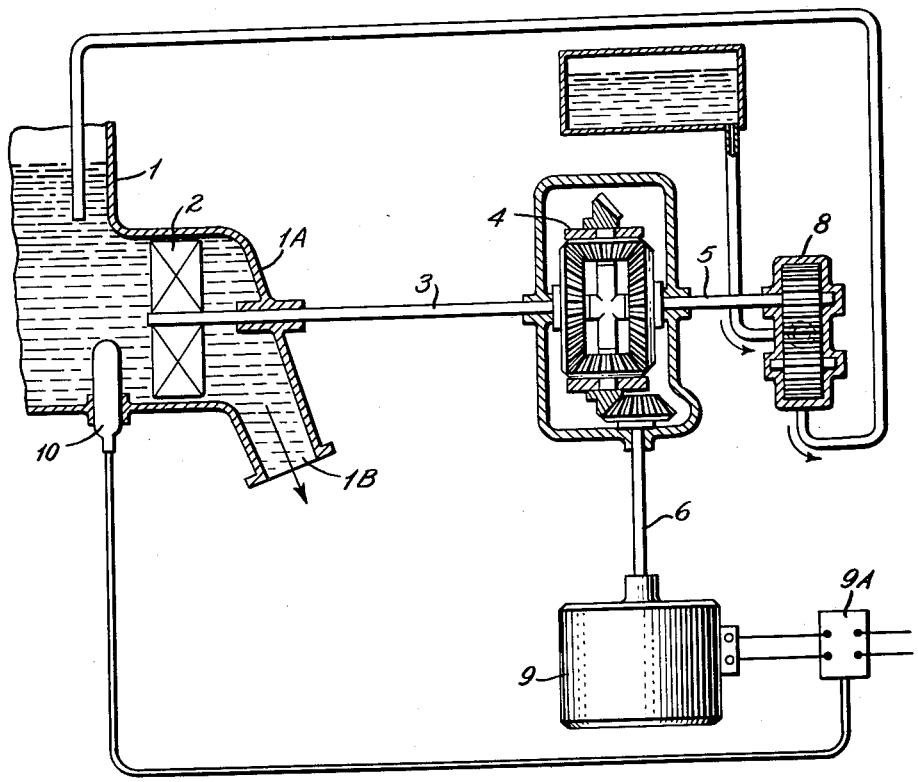

July 8, 1952  D. N. WALKER  2,602,461
LUBRICATION SYSTEM
Filed Nov. 2, 1945

INVENTOR
*Daniel Norman Walker*

BY *Stevens and Davis*
ATTORNEYS

Patented July 8, 1952

2,602,461

UNITED STATES PATENT OFFICE 2,602,461

LUBRICATION SYSTEM

Daniel Norman Walker, Ashby Parva, near Rugby, England, assignor to Power Jets (Research & Development) Limited, London, England Application November 2, 1945, Serial No. 626,329
In Great Britain December 10, 1943

4 Claims. (Cl. 137—90)

This invention relates to lubrication systems for aircraft engines or the like wherein it is necessary for a lubricant thinner or diluent to be added to the lubricant to keep its viscosity within desirable limits.

The problem of controlling the viscosity of the lubricant in lubrication systems for aircraft engines or the like arises particularly in colder climates. When an aircraft engine is stopped or shut down, it is accepted practice to add a lubricant diluent at this time in order to condition the lubrication system for the next starting. In the past, arbitrary quantities of diluent were added to the system when the engine was stopped by the pilot or other personnel switching on a pump and injecting diluent into the system until he felt a sufficient amount had been added. Thus, it is immediately apparent that an element of personal judgment may be introduced into the operation with the possible consequence that forgetfulness or overzealousness may have bad results. By way of illustration, the aircraft may make a series of short runs. If the user follows the normal routine of injecting diluent at each stop, then there is the danger that the lubricant may have its viscosity excessively reduced. Accordingly this invention provides apparatus which will eliminate the element of personal judgment and which will insure the addition of an appropriate amount of diluent at each stopping of an aircraft engine or the like.

It is important to realize at this time that the primary objective is to condition the engine for its next starting. Therefore, the viscosity of the lubricant in the system, while being correct when the engine is stopped, nevertheless, will increase appreciably after the lubricant has cooled. Consequently, an amount of diluent must be added to compensate for the normal increase of viscosity due to the decreases of temperature. It is thus apparent that the condition of the lubricant in the system for the next starting will be dependent upon the temperature and viscosity of the lubricant when the engine is stopped. By means of the present invention, the foregoing factors are taken into account and an amount of diluent sufficient to condition the lubrication system for the next starting is automatically injected.

This is accomplished by the present invention by providing an apparatus which will inject an amount of diluent into the lubrication system dependent upon the viscosity and temperature of the lubricant in the system.

Means are provided to supply the diluent to the system at a rate directly proportional to the viscosity of the lubricant in the system. Hence, as diluent is supplied and the viscosity is reduced, the rate of supplying diluent decreases. It can thus be seen that for a given period of operation, the amount of diluent supplied and the rate at which it is supplied will vary dependent upon the viscosity of the lubricant of the system at the time of stopping. However, the viscosity at stopping will usually be low due to the high temperature of the fluid. Thus, if the proper amount of diluent is to be supplied to the system, the false indication of the viscosity due to the temperature must be taken into account. This is accomplished by the present invention by providing temperature responsive means to cooperate with the aforementioned means to supply diluent. Generally, the cooperation can be effected in one of two ways. The temperature responsive means can be arranged to control the length of time that the diluent is supplied, in which case the higher the temperature of the fluid at stopping the longer the means to supply diluent is permitted to operate. Or the temperature-responsive means can be arranged to modulate the rate of supplying diluent which is primarily controlled by viscosity as previously described. In the latter case, the diluent is supplied for a fixed time.

It is therefore an object of the present invention to provide apparatus for automatically injecting a sufficient quantity of diluent into a lubrication system for an aircraft engine or the like when the engine is stopped to properly condition the system for the next starting.

It is a further object of this invention to provide apparatus as above described which will perform the desired functions in a more efficient and economical manner than any means heretofore available.

Figure 2:
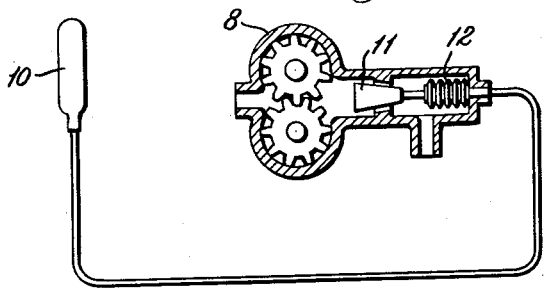

Other and further objects of the present invention will become readily apparent from a detailed consideration of the following description when taken in conjunction with the accompanying drawing in which:

Figure 1 is a schematic representation of a lubrication system illustrating the principles of the present invention; and Figure 2 is a schematic representation showing an alternative form of this invention wherein temperature responsive means modulate the rate of diluent supply.

Referring now to the drawing, Figure 1 shows a main tank or reservoir 1 for lubricant having an outlet 1A leading to a delivery pipe connection 1B. The outlet 1A is circular in cross section and is arranged to house a paddle wheel 2 which is carried on a spindle 3 constituting an output spindle from a conventional differential gear assembly 4. A second output spindle 5 from the assembly 4 drives a gear pump 8 which delivers diluent from a source to the tank 1 as shown. Power output spindle 6 of the assembly 4 is driven by an electric motor 9 supplied with energy from a suitable source.

By this arrangement the output of the motor 9 will be divided between the paddle wheel 2 and pump 8. As the paddle wheel 2 is constantly immersed in the lubricant, its resistance to rotation will be dependent upon the viscosity of the lubricant.

When the aircraft engine is stopped the motor 9 is automatically started and pump 8 supplies diluent to the system at a rate dependent upon the viscosity of the lubricant. As diluent is supplied, the viscosity of the lubricant is thereby reduced and consequently, the rate of supplying diluent is accordingly reduced. It is apparent, however, that with this arrangement the viscosity of the lubricant will never be sufficiently reduced so that the complete output of motor 9 will go to paddle wheel 2. Therefore a time switch 9A is provided to cut off the motor 9.

The temperature of the lubricant in tank 1 is normally high when the engine is stopped. The viscosity of the lubricant is therefore low and the rate of supplying diluent by pump 8 is also low. When the lubricant cools, its viscosity will increase dependent upon the extent of the temperature drop. The higher the temperature drop the greater the increase of viscosity. Thus, if the lubricant is to be properly conditioned for the next engine starting, the false indication of the viscosity due to temperature must be taken into account.

A temperature responsive means 10 such as a bulb is connected to switch 9A by means of a capillary tube. Switch 9A is a thermal responsive time switch which permits the motor 9 to operate for a duration dependent upon the temperature of the lubricant at the time of stopping the engine. Switch 9A per se forms no part of the present invention and its construction is obvious to one skilled in the art from the teachings of Patent No. 1,925,781, Reissue Patent No. 20,240, and British Patent No. 444,736. Thus, the higher the temperature of the lubricant when the engine is stopped, the longer the motor 9 and pump 8 are permitted to run. Therefore, a greater quantity of lubricant will be injected into the system.

Turning now to Figure 2, an alternative form of the invention is shown. In this form the paddle wheel 2, differential gear assembly 4, pump 8, and motor 9 are arranged in the same manner as Figure 1. In this form the switch 9A controlling the operation of motor 9 is a time switch which permits the motor 9 to operate for a definite fixed time at the termination of which the motor 9 is cut off. Such time switches are well known in the art. The outlet of pump 8 is arranged with a taper gag 11 connected to an elastic chamber 12. The bulb 10 is connected to the chamber 12 by means of a capillary tube. In this form of the present invention, the false indication of the lubricant viscosity due to temperature is compensated by modulating the rate of supplying the diluent responsive to the temperature of the lubricant. A high lubricant temperature will cause the chamber 12 to expand and the taper gag 11 to be moved to the left as shown in the drawing. The rate of delivering diluent by the pump 8 will therefore be increased. As motor 9 operates for a fixed time by reason of switch 9A an increased rate of delivering diluent will cause an increase in the total quantity of diluent added to the system.

While this invention has been described as being particularly applicable upon the stopping of an aircraft engine it is to be understood that it is not to be limited to such use. This invention can be utilized with a lubrication system of an aircraft engine while it is operating, for example, under extremely cold conditions and the viscosity of the lubricant can become excessive, or, after prolonged idling.

While this invention has been described in specific embodiments, nevertheless, various changes and modifications obvious to one skilled in the art are within the spirit, scope, and contemplation of the present invention.

I claim:

1. A lubrication system comprising a reservoir containing lubricant, apparatus to sense the viscosity of the lubricant, apparatus to sense the temperature of the lubricant, a source of diluent, a pump to deliver diluent to said lubricant reservoir, a mechanism responsive to the viscosity sensing apparatus for controlling the speed of said pump, means controlling the duration of the period of operation of said pump, means defining an area of flow for the output of said pump, and means responsive to the temperature sensing apparatus to modify said means controlling the duration of the period of operation of said pump so that the amount of diluent delivered during an operating period is controlled directly in accordance with the temperature and viscosity of the lubricant.

2. A lubrication system comprising a reservoir containing lubricant, apparatus to sense the viscosity of the lubricant, apparatus to sense the temperature of the lubricant, a source of diluent, a pump to deliver diluent to said lubricant reservoir, a mechanism responsive to the viscosity sensing apparatus for controlling the speed of said pump, means controlling the duration of the period of operation of said pump, means defining a variable area of flow for the output of said pump, and means responsive to the temperature sensing apparatus to modify said means defining a variable area of flow for the output of said pump so that the amount of diluent delivered during an operating period is controlled directly in accordance with the temperature and viscosity of the lubricant.

3. A lubrication system comprising a reservoir containing lubricant, a rotatable paddle wheel at least partly submerged in the lubricant, apparatus to sense the temperature of the lubricant, a source of diluent, a pump to deliver diluent to said reservoir, differential gearing having a power driven input spindle and two output spindles, one of the output spindles being connected to drive said paddle wheel and the other being connected to drive said pump, said paddle wheel and differential gearing cooperating to control the speed of said pump directly in accordance with the viscosity of the lubricant, a time switch for controlling the duration of the period of operation of said pump, a pipe connected to said pump for defining an area of flow for the output of said pump, and means responsive to the temperature sensing apparatus to modify the time switch to control duration of the period of operation of said pump directly in accordance with the temperature of the lubricant.

4. A lubrication system comprising a reservoir containing lubricant, a rotatable paddle wheel at least partly submerged in the lubricant, apparatus to sense the temperature of the lubricant, a source of diluent, a pump to deliver diluent to said reservoir, differential gearing having a power driven input spindle and two output spindles, one of the output spindles being connected to drive said paddle wheel and the other being connected to drive said pump, said paddle wheel and differential gearing cooperating to control the speed of said pump directly in accordance with the viscosity of the lubricant, a time switch for controlling the duration of the period of operation of said pump, a pipe connected to said pump for defining an area of flow for the output of said pump, a taper gag in said pipe to vary the area of flow, and means responsive to said temperature sensing apparatus to modify the position of said taper gag in said pipe to control the area of flow directly in accordance with the temperature of the lubricant.

DANIEL NORMAN WALKER.

REFERENCES CITED

The following references are of record in the file of this patent:

UNITED STATES PATENTS

| Number | Name | Date |
|---|---|---|
| 1,838,710 | Schur | Dec. 29, 1931 |
| 1,985,312 | Bryson | Dec. 25, 1934 |
| 2,280,947 | Gulliksen | Apr. 28, 1942 |
| 2,311,069 | Miller | Feb. 16, 1943 |
| 2,345,606 | Jones | Apr. 4, 1944 |
| 2,400,910 | Booth | May 28, 1946 |

FOREIGN PATENTS

| Number | Country | Date |
|---|---|---|
| 510,346 | Great Britain | 1937 |
| 688,187 | Germany | of 1940 |